United States Patent [19]

Price

[11] 4,109,676
[45] Aug. 29, 1978

[54] FILTERS

[75] Inventor: Ernest James Price, Solihull, England

[73] Assignee: E. J. Price (Developments) Limited, Birmingham, England

[21] Appl. No.: 750,452

[22] Filed: Dec. 14, 1976

[30] Foreign Application Priority Data

Dec. 17, 1975 [GB] United Kingdom ............... 51546/75

[51] Int. Cl.² ............................................. F16K 45/02
[52] U.S. Cl. .................................. 137/550; 137/557; 55/310; 55/313; 55/503; 210/494 R
[58] Field of Search ................. 210/90, 130, 236, 494, 210/120, 436, 472; 55/310, 313, 213, 503; 137/544, 545, 546, 547, 549, 550

[56] References Cited

U.S. PATENT DOCUMENTS

| 2,661,846 | 12/1953 | Lash et al. | 210/494 X |
| 3,389,799 | 6/1968 | Thrasher, Jr. | 210/436 X |
| 3,504,803 | 4/1970 | Brayman | 210/494 X |

*Primary Examiner*—William R. Cline
*Attorney, Agent, or Firm*—Scrivener, Parker, Scrivener & Clarke

[57] ABSTRACT

The casing for a filter comprises at least two body portions defining a chamber for the filter means. The body portions are relatively movable between a closed position in which fluid cannot escape between them, and an open position in which fluid can escape between them. An increase in pressure in the chamber tends to urge the body portions to their open position, but there is resilient means which resists that and only permits the portions to part when the pressure in the chamber reaches a predetermined value.

12 Claims, 3 Drawing Figures

FILTERS

This invention is concerned with improvements in and relating to filters intended for use in filtering fluids, the term fluids being used herein as a general term to include liquids, gases, vapours and mixtures thereof, and also such fluids when carrying particles in suspension.

It is common practice in filtering a fluid to cause the fluid to pass through a chamber containing a filter element disposed in the path of the fluid. It may happen that the pressure inside the chamber rises above a predetermined value, for example due to a malfunction elsewhere in the fluid circuit. Using the present invention it is possible to provide a filter which serves additionally as a safety valve to relieve excess pressure. In some applications the pressure in the filter increases as the filter element becomes progressively clogged and the arrangement may then be such that the filter operates to relieve the pressure when it rises above a predetermined value.

According to the present invention there is provided a filter casing comprising at least two body portions which together define a chamber for filter means and provided with fluid inlet means and fluid outlet means such that when filter means is present in the chamber fluid passing through the chamber from the inlet means to the outlet means is constrained to pass through the filter means, the portions being relatively movable as between a closed position in which fluid cannot escape between them from the chamber and an open position in which fluid can escape between them from the chamber, fluid pressure in the chamber tending to urge the portions from their closed position to their open position, and there being provided resilient means operative to resist such movement until the pressure in the chamber reaches a predetermined value.

It is envisaged there would usually be two body portions, but it is possible for there to be three or more. For example there may be a tubular portion with a disc-shaped portion at each end.

The invention also consists in a filter casing of the kind outlined above in combination with filter means disposed in or capable of being disposed in the chamber.

A filter embodying the present invention will now be described in greater detail, by way of example, with reference to the accompanying drawings, in which.

Figure 1:
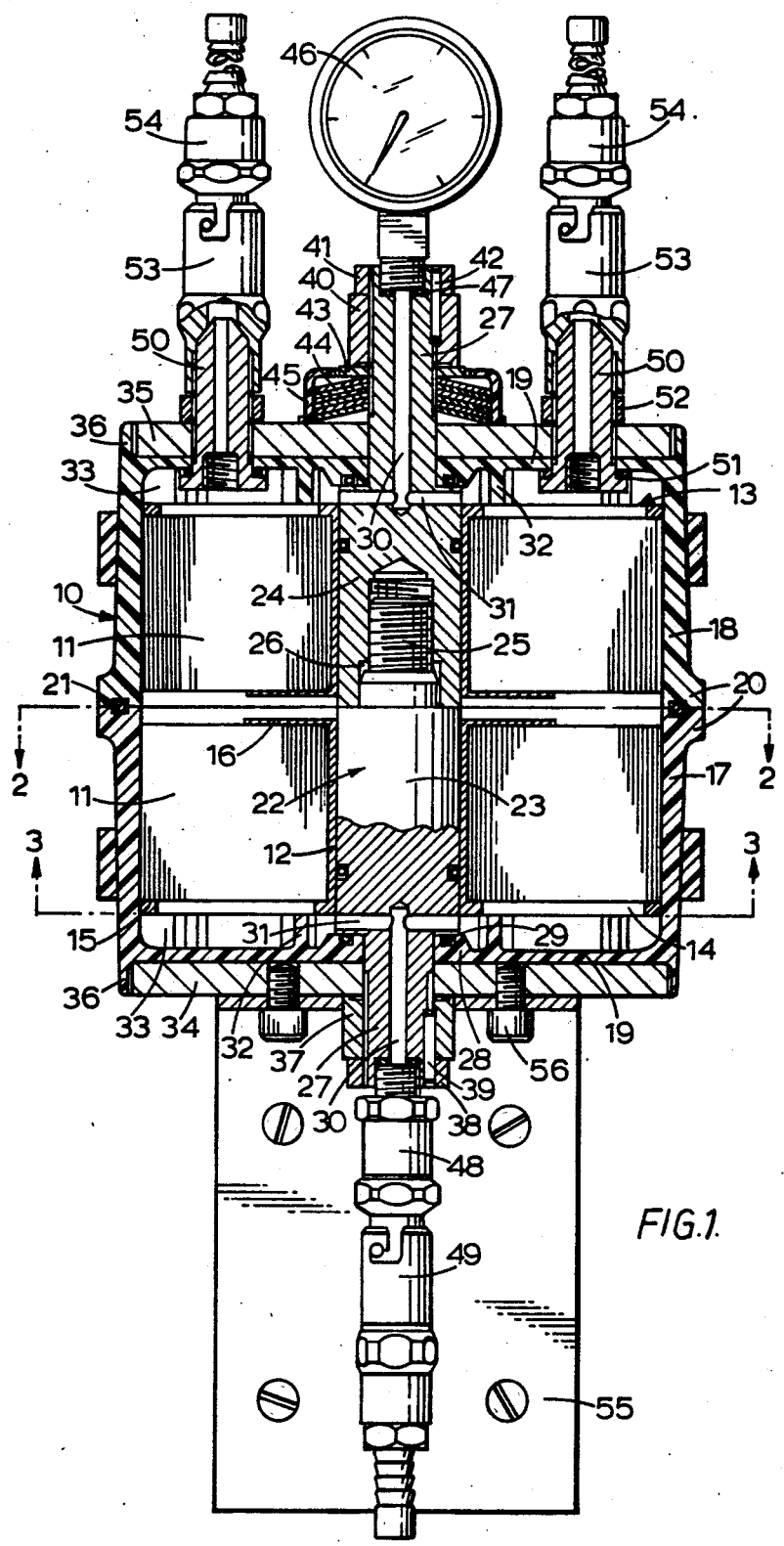
FIG. 1 is a longitudinal section through a filter.
Figure 3:
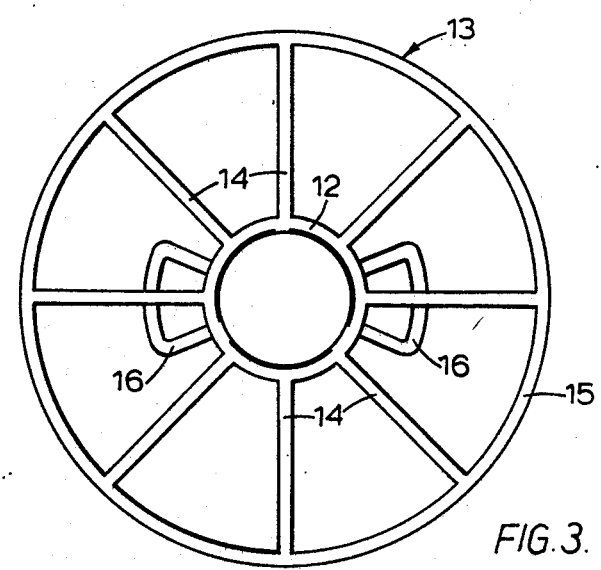
FIG. 3 is an end view of one of the holders for the filter elements, as viewed in the direction indicated by the line 3—3 in FIG. 1.

The filter comprises a casing, generally indicated at 10, containing filtering means comprising a pair of axially aligned filter elements 11. Each filter element 11 comprises a roll of absorbent paper or paper-like material (which will be referred to generically as tissue). The tissue is wound onto a cylindrical plastics tube 12 constituting part of a holder 13 of which the details are best seen in FIG. 3. The holder comprises, in addition to the tube 12, an end support constituted by a plurality of spokes 14, which extend radially outwards from one end of the tube 12, and a ring 15 interconnecting the outer ends of the spokes. At the end of the tube further from the end support the holder has two loops 16 which extend outwards from the end of the tube. The holder is made as a unitary moulding of a plastics material such as polypropylene which is relatively stiff in thick section but is quite flexible in thin section. The tube 12 and the end support are of relatively thick section so as to be quite stiff, but the loops 16 are sufficiently thin to be flexible. As shown in FIG. 1 the loops 16 normally lie against one end of the associated filter element 11; nevertheless the loops can be resiliently lifted away from the element to enable the user to pull the holder and its filter element out of the associated body moulding, as referred to below. During manufacture the filter element 11 may be wound directly onto the tube 12. Alternatively it may be wound onto a cardboard tube (not shown) which can be slid onto the tube 12 when the loops 16 have been flexed together out of the path of the cardboard tube. Likewise, the filter element 11 can be slid from the tube 12 whether or not it has been wound onto a cardboard tube.

The casing 10 is largely constituted by a pair of body mouldings 17 and 18 made from glass-filled nylon. Each moulding is of generally cylindrical shape, open at one end and with an integral end plate 19 at the other end. When the casing is assembled the open ends of the mouldings 17 and 18 face each other, and the filter elements 11 are in tight engagement with the cylindrical inside faces of the mouldings, one element being in one moulding and the other element being in the other moulding.

An integral outwardly directed flange 20 is formed around the mouth of each moulding, and an annular groove is provided in each flange, the arrangement being such that when the two mouldings are assembled together, as illustrated, the flanges 20 abut each other and the grooves co-operate together to form a single annular passage of square cross-section extending around the casing. An O-ring 21 is disposed in the passage and serves as a seal when the mouldings abut each other.

A metal rod 2 extends axially through the filter elements 11 and engages the inside of the tubes 12 so as to prevent air passing lengthwise between the rod and the tubes. The rod 22 is of composite form being assembled from two portions 23 and 24, portion 23 having an axially projecting, externally screw-threaded pin 25 formed integrally with it, and portion 24 having an axially extending blind hole 26 which is formed with a complementary internal thread. When the portions 23 and 24 are assembled together their annular end faces, around the pin 25 and the hole 26, abut each other.

From each end of the rod 22 projects an integral axial spigot 27 of diameter smaller than that of the rod. Each spigot 27 projects through a central hole in the end plate 19 of the adjacent body moulding. An integral boss 28 is formed on the inside of each end plate 19 around the spigot hole, and abuts the adjacent annular end face of the rod 22, that is the face from which the spigot 7 projects. A circular groove in the boss 28 houses an O-ring 29 which seals against the end face of the rod. An axial hole 30 is formed through each spigot 27 and extends a short way into the adjacent end of the rod 22. Transverse holes 31 formed through the rod 22 near the ends of the rod cross the axial holes 30 so that the transverse holes and axial holes together form ducts extending between the interior and the exterior of the casing 10.

Figure 2:
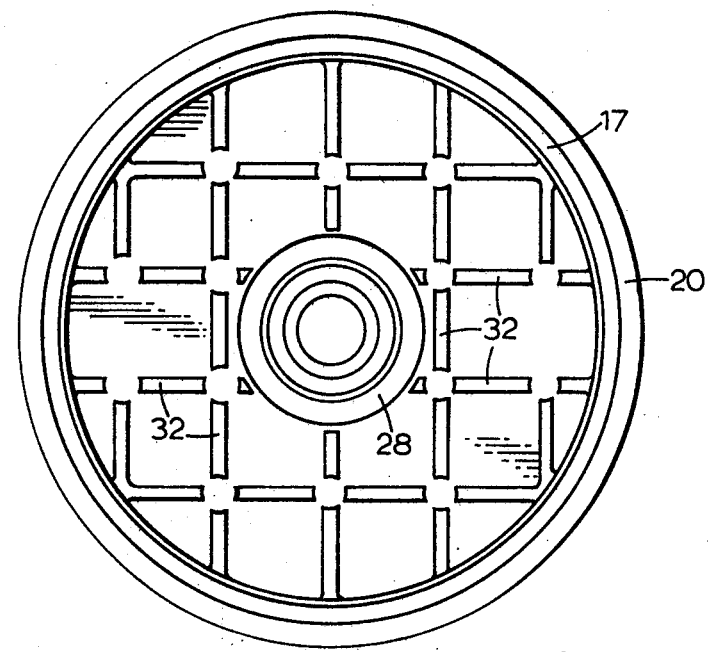
FIG. 2 is an end view of one of the body mouldings of the filter casing, as viewed in the direction indicated by the line 2—2 in FIG. 1.

The end plates 19 of the body mouldings 17 and 18 are formed with arrays of upstanding walls 32, arranged as shown in FIG. 2. The walls 32 are of a uniform height somewhat greater than that of the bosses 28. The end supports of the holders 13 abut the walls 32 so that gaps 33 are left between the end plates 19 of the body mouldings and the adjacent ends of the filter elements 11. The transverse holes 31 open into these gaps as illustrated.

Stiff, metal retaining plates 34 and 35 of circular shape are disposed against the outer faces of the end plate of each body moulding in order to stiffen the end plates 19 of the body mouldings 17 and 18 respectively, and prevent them being distorted when the filter is in use. Each retaining plate has a central hole through which the associated spigot 27 projects. Each body moulding has an integral flange 36 extending axially from the periphery of its end plate 19 to encircle the periphery of the associated retaining plate.

Each of the projecting spigots 27 is externally screw-threaded. At one end of the filter (the lower end as viewed in FIG. 1) a nut 37 engages the spigot and abuts the retaining plate 34. A lock nut 38 is tightened against the nut 37 and relative rotation of the nuts is then prevented by drilling a hole into the nuts and the spigot and inserting a dowel pin 39. At the other end of the filter there are a nut 40, lock nut 41 and dowel pin 42 similar to the nut 37, lock nut 38 and dowel pin 39 respectively. However, between the nut 40 and the stiffening plate 35 there are a plane washer 43 and a stack of Belleville washers 44, of which the concave faces are all directed towards the stiffening plate. A cover 45 of a plastics material protects the Belleville washers 44 and is held in place by friction. During assembly the washers 44 are prestressed, to exert a predetermined force, by the rotation of the nut 40 to an appropriate position on the spigot.

A circumferential band 46 encircles each of the body mouldings 17 and 18. The outer surfaces of the body mouldings are slightly tapered, and the inner surfaces of the bands 46 are similarly tapered. During assembly the bands 46 are forced into position in an axial direction and are retained in place by friction.

The outer end parts of the axial holes 30 in the spigots 27 are counterbored and tapped. At the upper end of the filter illustrated the spigot is connected to pressure-gauge 46 by means of an inlet tube which screws into the counterbore and engages a resilient sealing washer 47. At the lower end the filter is similarly connected to an inlet fitting 48 which can be releasably connected, by means of a bayonet-type connection, with a valve coupling 49 which is connectable to a flexible line through which the fluid to be filtered passes to the filter. The valve coupling 49 contains a valve which closes automatically when the fitting is disconnected from the inlet fitting 48.

At the upper end of the filter, holes are formed in the end plate 19 and stiffening plate 35 to receive a pair of outlet fittings 50. Each outlet fitting is externally screw-threaded and engages an internal thread in the associated hole in the stiffening plate. A sealing washer 51 is trapped between the upper end plate 19 and an outwardly directed flange on the inner end of each outlet fitting. A lock nut 52 secures the outlet fitting in place. A valve coupling 53 is screwed onto the outer end of each outlet fitting 50; the engagement between complementary frusto-conical faces on each outlet fitting and valve coupling prevents the escape of fluid. Each valve coupling 53 contains a valve similar to that in the valve coupling 49 and opens when engaged by a complementary connector 54. The connector 54 is connectable to a flexible line through which the filtered fluid passes from the filter. Each valve coupling 53 and connector 54 can readily be connected and disconnected by means of a bayonet-type connection.

The filter may be mounted in any suitable manner. In the arrangement shown in FIG. 1 the filter is secured to a two-armed bracket 55 by means of screws 56.

The filter illustrated is primarily intended for use in filtering compressed air such as may be used in factories for paint-spraying and the operation of machinery. The incoming air enters through the inlet fitting 48, passes through the axial hole 30 and transverse hole 31 to the lower of the gaps 33. It passes thence through the two filter elements 11 and is discharged by way of the upper of the gaps 33 through the outlet fittings 50. Tight engagement between the filter elements 11 and the inner faces of the cylindrical walls of the body mouldings 17 and 18 prevents air passing round the outsides of the filter elements. Similarly, O-rings 57 operative between the central rod 22 and the tubes 12 ensure no air passes up the insides of those elements. In use it may well happen that the lower of the filter elements is forced upwards against the upper filter element, but this does not affect the operation of the filter.

Initially the filter offers very little resistance to the passage of air through it. As the filter elements become progressively clogged, however, the filter offers increasing resistance, and the pressure indicated by the gauge 46 falls. When the pressure has fallen to a predetermined value the filter elements are replaced, or one only of the filter elements is replaced if the other has picked up relatively little material. To open the casing the two body mouldings are rotated relatively to each other to unscrew the pin 25 from the hole 26. The mouldings are then separated and the elements are removed by means of the loops 16. Fresh elements are inserted and the mouldings are screwed together again. During this operation the Belleville washers 44 remain fully compressed, the arrangement being such that on reassembly the annular end faces of the portions 23 and 24 of the rod 22 abut each other as the adjacent annular end faces of the spigots 27 abut each other. For this to occur the filter casing must be relatively rigid, and its dimensions must be precisely controlled in manufacture. The rigidity of the body mouldings 17 and 18 is enhanced by the presence of the stiffening plate 34 and 35, and during manufacture the length of the rod 22 (between the spigots 27) is precisely related to the distance between the bosses 28 when the flanges 20 abut each other.

The force exerted by the washers 44 is normally such that the body mouldings part only when the air pressure in the filter rises somewhat above the maximum pressure encountered in normal use. The mouldings therefore part to relieve excess pressure only when a fault has occurred. Due to the fact that the holders 13 can slide lengthwise on the rod 22 without offering much frictional resistance, it is the pressure at the inlet which determines the parting of the body mouldings rather than the pressure at the outlets. In a typical arrangement air is supplied at between 80 and 100 p.s.i., the maximum pressure being 120 p.s.i., and the mouldings part only when the pressure reaches about 160 p.s.i. If the pressure rises only gradually above the predetermined value the body mouldings may part slightly, relieving the pressure and allowing the mouldings to re-seal, but if the pressure increases more rapidly the O-ring 21 may be distorted or destroyed when the mouldings part, and must be replaced before the filter can be used again.

Numerous modifications can be incorporated. For example the Belleville washers 44 may be replaced by some other form of spring, though such a spring tends to be unnecessarily bulky. Where the air carries liquid such as water or oil in suspension there may be a tendency for the liquid to collect in the lower of the gaps 33. Fittings may be provided to enable liquid to be bled from that gap, the fittings conveniently projecting downwards from the end plate 19 and extending through the stiffening plate 34. In another modification the rod 22 is made as a unitary whole so that the filter can no longer be opened by unscrewing the portions 23 and 24, and can only be opened after the nut 37 and lock nut 38 have been removed from the lower of the spigots 27. The associated dowel pin may then be omitted. In another modification, particularly suited to constructions incorporating a unitary rod 22, there is a single filter element occupying the space taken by the two elements 11. In yet another modification the outlet or an outlet is by way of the duct in the upper spigot 27, and the pressure gauge is either omitted or connected elsewhere, as for example to one of the outlet fittings.

Although the filter illustrated is described as being of use in filtering air it may of course be used for filtering other gases, and may also be used for filtering liquids such as oil.

I claim:

1. A casing for a filter comprising at least two relatively movable body portions which together define a chamber for receiving filter means, said chamber having fluid inlet and outlet means arranged that when filter means is received within the chamber fluid passing there through from the inlet to the outlet means is constrained to pass through the filter means, said body portions being relatively movable with respect to each other between a closed position wherein said chamber is fluid-tight and an open position, and resilient means operative on said body portions to resist relative movement there between, said resilient means being yieldable to permit the body portions to move to their open position and fluid to escape from said chamber between said body portions wherever the pressure of the fluid in the chamber exceeds a predetermined value.

2. A filter comprising a filter casing according to claim 1 in combination with filter means disposed in or capable of being disposed in the chamber.

3. A filter according to claim 2 in which the filter means comprises at least one roll of absorbent tissue so disposed that in passing from the fluid inlet means to the fluid outlet means fluid is constrained to pass through the roll from one end thereof to the other.

4. A filter according to claim 3 in which the roll of tissue is mounted on a holder which supports the roll when it is being inserted into the chamber.

5. A casing according to claim 1 in which there is connecting means operative between said first and second body portions, which connecting means is disconnectable to enable said first and second body portions to be separated and the filter means to be removed and replaced.

6. A casing according to claim 5 in which said connecting means includes support means, said first body portion being movable relative to said support means between its closed position and its open position, a stop on the support means engaged by said first body portion when in its closed position, the resilient means being pre-stressed and operative to urge said first body portion against said stop.

7. A casing according to claim 6 in which said connecting means extends through the interior of the chamber.

8. A casing according to claim 7 in which the casing comprises two body portions, each such body portion being in the shape of a tube open at one end and closed at the other end, the open ends facing each other so that the chamber extends into the interiors of the two portions.

9. A casing according to claim 7 in which the connecting means also includes a tie member, there being complementary threaded formations on the support means and the tie member whereby the support means and tie member can be disconnected and reconnected by relative rotation thereof, and whereby the body portions can be separated and reassembled.

10. A casing according to claim 9 in which at least one of the fluid inlet means and fluid outlet means extends through the tie member.

11. A casing according to claim 6 in which the resilient means comprises Belleville washers on the support, external to the chamber.

12. A casing according to claim 1 having a pressure gauge operative to determine the pressure in the chamber in the neighborhood of the fluid outlet means.

* * * * *